United States Patent
Belimpasakis et al.

(10) Patent No.: US 10,149,239 B2
(45) Date of Patent: Dec. 4, 2018

(54) SYSTEM AND METHOD FOR THE RECEPTION OF CONTENT ITEMS

(71) Applicant: Nokia Technologies Oy, Espoo (FI)

(72) Inventors: Petros Belimpasakis, Tampere (FI); Rod Walsh, Tampere (FI); Toni Paila, Degerby (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/243,388

(22) Filed: Aug. 22, 2016

(65) Prior Publication Data

US 2017/0048793 A1 Feb. 16, 2017

Related U.S. Application Data

(63) Continuation of application No. 10/098,848, filed on Mar. 15, 2002, now abandoned.

(51) Int. Cl.
| | |
|---|---|
| *H04W 48/20* | (2009.01) |
| *H04H 20/24* | (2008.01) |
| *H04H 60/49* | (2008.01) |
| *H04L 12/54* | (2013.01) |
| *H04N 21/222* | (2011.01) |
| *H04N 21/278* | (2011.01) |

(Continued)

(52) U.S. Cl.
CPC ............ *H04W 48/20* (2013.01); *H04H 20/24* (2013.01); *H04H 60/49* (2013.01); *H04L 12/5692* (2013.01); *H04L 65/1006* (2013.01); *H04L 65/4084* (2013.01); *H04L 65/4092* (2013.01); *H04L 67/02* (2013.01); *H04L 67/16* (2013.01); *H04L 67/34* (2013.01); *H04L 69/16* (2013.01); *H04L 69/167* (2013.01); *H04L 69/329* (2013.01); *H04N 21/2223* (2013.01); *H04N 21/278* (2013.01); *H04N 21/41407* (2013.01); *H04N 21/4355* (2013.01); *H04N 21/4431* (2013.01); *H04N 21/47202* (2013.01); *H04N 21/482* (2013.01); *H04N 21/6112* (2013.01); *H04N 21/431* (2013.01)

(58) Field of Classification Search
CPC ... H04W 48/20; H04H 60/49; H04L 65/1006; H04L 67/02; H04L 67/16
See application file for complete search history.

(56) References Cited

U.S. PATENT DOCUMENTS

| | | |
|---|---|---|
| 5,701,465 A | 12/1997 | Baugher et al. |
| 5,898,668 A | 4/1999 | Shaffer |

(Continued)

FOREIGN PATENT DOCUMENTS

| | | |
|---|---|---|
| EP | 1091601 A2 | 4/2001 |
| WO | 9819479 A1 | 5/1998 |

(Continued)

OTHER PUBLICATIONS

Handley et al. (RFC 2327, Apr. 1998, 42 pages).*

(Continued)

*Primary Examiner* — Oleg Korsak
(74) *Attorney, Agent, or Firm* — Ditthavong & Steiner, P.C.

(57) ABSTRACT

A system and method for the reception of content items, including the ability to handle a plurality of service announcement formats and the ability to select, for a plurality of network access points, the best access point for receiving items.

19 Claims, 2 Drawing Sheets

(51) Int. Cl.

| | |
|---|---|
| *H04N 21/414* | (2011.01) |
| *H04N 21/435* | (2011.01) |
| *H04N 21/443* | (2011.01) |
| *H04N 21/472* | (2011.01) |
| *H04N 21/482* | (2011.01) |
| *H04N 21/61* | (2011.01) |
| *H04L 29/06* | (2006.01) |
| *H04L 29/08* | (2006.01) |
| *H04N 21/431* | (2011.01) |

(56) References Cited

U.S. PATENT DOCUMENTS

| | | | |
|---|---|---|---|
| 5,903,558 | A | 5/1999 | Jones et al. |
| 6,021,182 | A * | 2/2000 | Toyosawa ............ H04L 12/2856 379/100.12 |
| 6,058,422 | A | 5/2000 | Ayanoglu et al. |
| 6,108,706 | A | 8/2000 | Birdwell et al. |
| 6,212,550 | B1 | 4/2001 | Segur |
| 6,615,236 | B2 | 9/2003 | Donovan et al. |
| 6,628,625 | B1 | 9/2003 | Birdwell et al. |
| 6,643,655 | B2 | 11/2003 | Oashi et al. |
| 6,732,176 | B1 | 5/2004 | Stewart et al. |
| 6,882,677 | B2 | 4/2005 | Dehner et al. |
| 2002/0059453 | A1 * | 5/2002 | Eriksson ............ H04L 12/2856 709/238 |
| 2002/0095459 | A1 | 7/2002 | Laux et al. |
| 2002/0143591 | A1 | 10/2002 | Connelly |

FOREIGN PATENT DOCUMENTS

| | | |
|---|---|---|
| WO | 9837685 A2 | 8/1998 |
| WO | 9943171 A1 | 8/1999 |
| WO | 0150790 A1 | 7/2001 |
| WO | 0163946 A1 | 8/2001 |
| WO | 0213415 A2 | 2/2002 |

OTHER PUBLICATIONS

Han et al. (WebSplitter: A Unified XML Framework for Multi-Device Collaborative Web Browsing, CSCW'00, Dec. 2-6, 2000, pp. 221-230).*

Bhagwat et al., "Transparent Resource Discovery for Mobile Computers", First Workshop on Mobile Computing Systems and Applications, Dec. 8-9, 1994, retrieved from https://www.semanticscholar.org/paper/Transparent-Resource-Discovery-for-Mobile-Bhagwat-Tripathi/3d4e7ff8e9c5df2bdb4e8107e5877bd657fe78b3/pdf, 3 Pages.

CPA Global, "System and Method for the Reception of Content Items", Level 3 Search Report, May 23, 2013, 22 Pages.

Office Action for corresponding European Patent Application No. 03744464.3-2412, dated May 5, 2010, pp. 5 pages.

Supplementary European Search Report for corresponding European Patent Application No. 03744464, dated Oct. 18, 2007, 5 pages.

International Search Report for corresponding International Application No. PCT/IB03/00927, dated Jul. 10, 2003, 4 pages.

UCL Multimedia, "Session Directory", retrieved on Aug. 23, 2016 from http://www-mice.cs.ucl.ac.uk/multimedia/software/sdr/, 2 pages.

Skystream Networks, "zBand Advanced Content Distribution Management", retrieved on Jun. 11, 2002, from http://www.skystream.com/zband/zband.stm, 4 Pages.

* cited by examiner

SYSTEM AND METHOD FOR THE RECEPTION OF CONTENT ITEMS

RELATED APPLICATION

This application is a continuation of U.S. patent application Ser. No. 10/098,848, filed Mar. 15, 2002, entitled "SYSTEM AND METHOD FOR THE RECEPTION OF CONTENT ITEMS", which is incorporated herein by reference in its entirety.

FIELD OF INVENTION

This invention relates to systems and methods for the reception of content items.

BACKGROUND INFORMATION

In recent years, there has been an increase in the distribution of content items such as movies, music, and software using network access points, particularly wireless network access points. There has also been an increase in the different types of access points in use. For example there has been in increase in the number of DVB-T cells and 802.11b base stations. It is therefore not unexpected for more than one type of access point to be available to a particular content-consuming device.

The distribution of content items is often announced by way of service announcements. In recent times the number of different service announcements formats has increased. For example, DVB-SI, SIP, SLP, and SAP/SDP formats are all now in common use.

Accordingly, there exists the circumstance where a multitude of different content items may be announced via a multitude of different formats offered over a multitude of different network access points.

SUMMARY OF THE INVENTION

Embodiments of the present invention provide a system and method for the reception of content items, including the ability to handle a plurality of service announcement formats and the ability to select, for a plurality of network access points, the best access point for receiving items.

DETAILED DESCRIPTION OF THE INVENTION

General Operation

Figure 1:
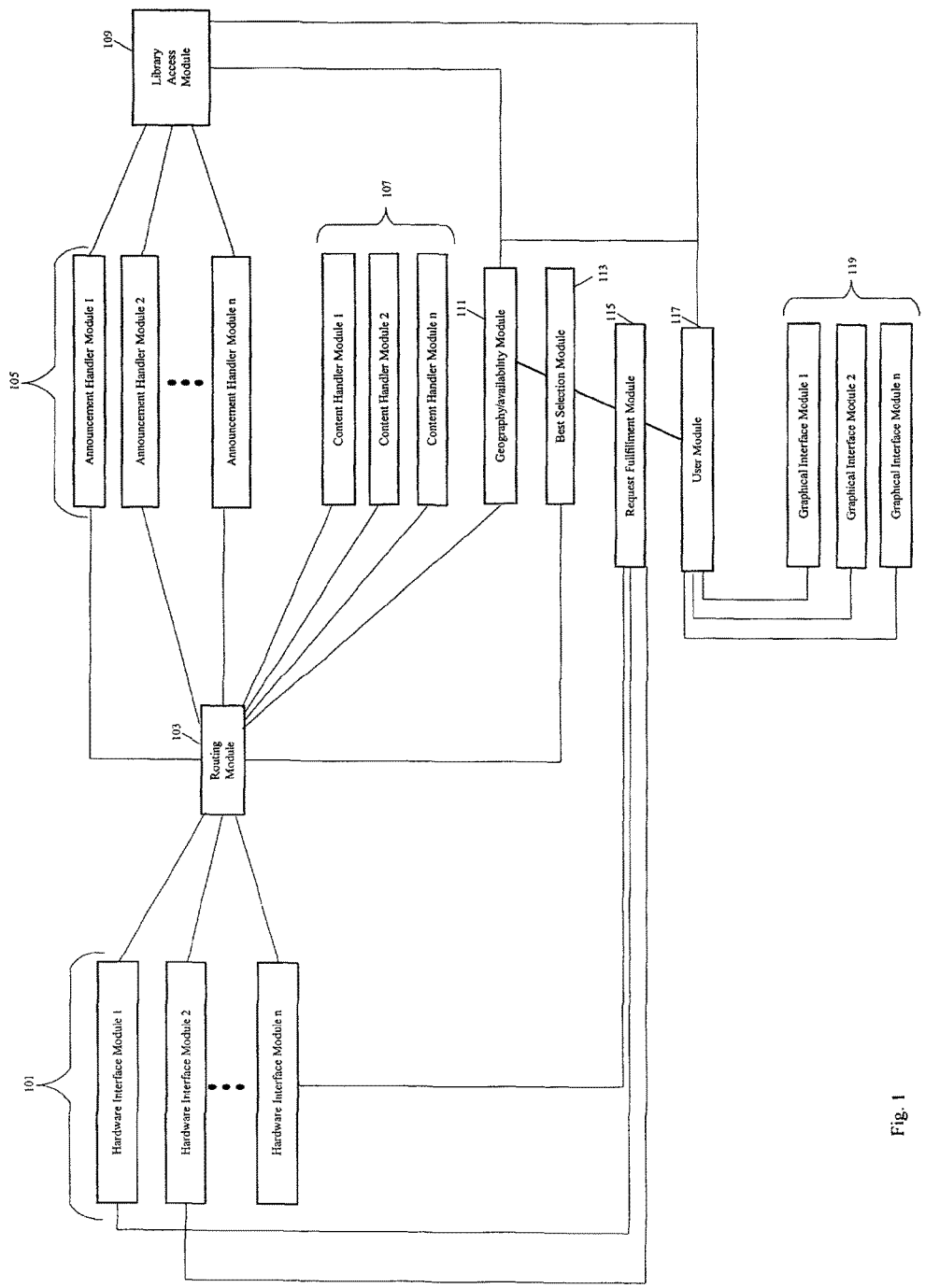
FIG. 1 shows an exemplary software module view according to embodiments of the invention.

According to embodiments of the present invention there is provided a number of software modules running on a general purpose computer with one or more network interfaces. The device may be, for example, a mobile device equipped with DVB-T (Terrestrial Digital Video Broadcast) and IEEE 802.11b interfaces. Other possible network interfaces include those that provide connectivity to UMTS (Universal Mobile Telecommunications Service) networks and those that provide connectivity to GPRS (General Packet Radio Service) networks. The functionality offered by the software modules includes allowing the device's user to learn of available content such as videos, musical selections, downloads, and the like offered by various network access points and to select content for reception. Network access points include, for example, DVB-T (Terrestrial Digital Video Broadcast) cells and IEEE 802.11b base stations. The functionality offered by these modules may also include determining the best way for a user to receive selected content. FIG. 1 is a an exemplary software module view showing modules according to embodiments of the invention.

Among the software modules running of the device may be one or more Hardware Interface Modules (HIMs) 101. In certain embodiments of the invention HIMs would be dynamically loaded upon device startup. Each HIM could interact with one or more device network interfaces so as to make available to other software modules data received by the device. For instance, one HIM might communicate with a device's 802.11b interface while a second HIM might interact with the device's DVB-T interface.

In certain embodiments a single HIM could interact with two or more different types of interfaces. For example, an HIM could interact with both a DVB-T interface and an 802.11b interface. Furthermore, a single HIM could interact with two or more interfaces of a particular type. Thus an HIM might interact two DVB-T interfaces situated on a single device.

Various data types can arrive via the network interfaces of the device. For example, the device may receive content items such as movies, musical selections, downloads, and the like. The device may also receive service announcements that impart information concerning available content. A service announcement for a particular content item might contain service properties relating to that item such as the content item's unique identifier, the content item's title, the network access points offering the content item, and the broadcast time of the content item. Other messages that may be received by the device include messages concerning network topology, network health messages, and messages containing information relating to the ideality of using various network access points.

There may be a number of different formats for each data type. For example, a service announcement might be formulated according to SAP/SDP (Session Announcement Protocol/Session Description Protocol), SAP/SDPng (Session Announcement Protocol/Session Description Protocol-Next Generation), DVB-SI (Digital Video Broadcast Service Information), SLP (Service Location Protocol), or SIP (Session Initiation Protocol). As another example, a content item might be in QuickTime, Realplayer, or Windows Media Player format.

According to certain embodiments of the invention, operating on the device may be one or more interpreter modules designed to handle incoming data of various types and/or formats.

For example, there may be one or more Announcement Handler Modules (AHMs) 105 that extract service properties from service announcements and make them available to other modules. For example, AHMs may make these properties available to Library Access Module (LAM) 109 that, as will be discussed in more detail below, acts to manage the information received via service announcements. In certain embodiments, a AHM may handle service announcements of only a single format. For example, a certain AHM may handle service announcements that are in SAP/SDP format. In other embodiments, an AHM may handle service announcements of a multitude of formats.

As a second type of interpreter module, running on the device may be one or more Content Handler Modules (CHMs) 107 that receive data relating to content items and take steps to allow presentation of the corresponding items. In certain embodiments a CHM might achieve this by launching an external application and appropriately passing the content data to that application. For example, a CHM might launch QuickTime Player, Adobe Acrobat Reader, an html viewer, or .zip decompression software as appropriate. Alternately, a CHM might be able to present content to a terminal user without needing to launch an external application. Thus a CHM might have the ability to decode MP3 data and pipe the resulting data to the device's audio interface. In certain embodiments each CHM may handle only content of a single format, while in other embodiments each CHM may handle content of a multitude of formats. As alluded to above, in certain embodiments of the invention a received content item could be a video game or other software application. Accordingly, a CHM could take steps to allow a user to make use of such a received application. For example, a CHM could pass a received application to a Java Virtual Machine (JVM) for execution. In certain embodiments, a CHM might ask for a user's permission before taking steps towards execution, such as asking the user, perhaps via a dialog box, if he would like to execute a received application immediately or save it for later use.

In certain embodiments, one or more CHMs could cooperate. Thus a received compressed item could be first be operated upon by a CHM that deals with decompression. The resultant decompressed item could then be passed to the appropriate CHM, such as one that handles received software applications.

In certain cases a particular content item may be offered by more than one network access point. However, due perhaps to the physical location of the device, only some of those network access points may be actually available to the device. Accordingly, a third type of a interpreter module is Geography/Availability Module (GAM) 111. GAM 111 makes use of messages such as network topology messages and network health messages in order to determine the network access points actually available to the device for receiving a particular content item.

Another type of interpreter module is Best Selection Module (BSM) 113. According to certain embodiments, BSM 113 makes use of messages relating to the ideality of using various network access points and determines the network access point for the device's receipt of a particular content item.

Also operating on the device may be Routing Module (RM) 103 that receives data, perhaps in the form of UDP or TCP packets, from one or more HIMs, determines the type and/or format of the data, and routes the data to the interpreter module responsible for handling data of that type and/or format.

Certain embodiments of the present invention may also provide User Module (UM) 117. UM 117 may, for example, create a requestable content directory, grid, or other presentation that can be browsed by a terminal user by way of a GUI (graphical user interface). UM 117 may communicate LAM 109 in order to procure, for purposes of populating the grid or other presentation, certain information received via service announcements.

In certain embodiments UM 117 might wish to indicate to a terminal user certain details concerning the availability of requestable content. For example, UM 117 might indicate for each requestable item whether the item is available from the network access point the device is presently connected to and/or any network access point accessible that device's location. UM 117 might communicate with GAM 111 in order to gain such information.

UM 117 may also accept user requests, entered via a GUI, for content indicated on the grid or other presentation. UM 117 could perform certain preparatory steps and then forward such requests to Request Fulfillment Module (RFM) 115. RFM 115 could consult BSM 113 to learn of the best network access point for receiving the selected content item. RFM 115 could then, if necessary, pass to the appropriate HIM information that the HIM will use to have the device connect to the appropriate network access point. In certain embodiments HIMs load dynamically upon device startup. In such cases each HIM could, upon loading notify RFM 115 of the types of access points it handles. Thus an HIM might indicate that it provides connectivity to IEEE 802.11b base stations. RFM 115 could use such information when determining the appropriate HIM to receive connection information.

During the device's reception of a content item, RFM 115 may query BSM 113 to see if there has been a change in the best access point for receiving the item. The RFM could, for example, be designed to perform the query when device location changes by more than a predetermined amount. Change in device location could be performed, for example, by the use of integrated GPS (Global Position System) hardware. RFM 115 might also be designed to perform the query periodically.

Also running on the device may be a Graphical Interface Module (GIM) 119. A GIM would interface with UM 117 and provide buttons, windows, and the like to allow a terminal user to communicate with UM 117. In certain embodiments there could be a plurality of GIMs, each specialized for a particular device type and/or purpose. For example, there could be one GIM intended for general purpose computers with small screens (e.g., a Nokia mobile terminal running Symbian OS) and another GIM intended for use with general purpose computers with larger screens (e.g., an Apple iMac). As another example, there could be one GIM intended for use by children and another for use by experienced users. Certain embodiments of the present invention employ an Interface Chooser Module (ICM). In such embodiments, the available GIMs could dynamically load at device startup and each could communicate its intended use the ICM. The ICM could determine the appropriate GIM and select it for use. For example, the ICM could determine the identity of the device that it was running on (e.g., Nokia mobile terminal) and select the corresponding GIM.

Various software modules and other aspects of the present invention will now be discussed in further detail.

Routing Module

As noted above, certain embodiments may include Routing Module (RM) 103 that receives data from one or more HIMs, determines the type and/or format of the data, and routes the data to the interpreter module responsible for handling data of that type and/or format. There are a number of ways RM 103 can determine which interpreter module should receive incoming data.

For instance, in certain embodiments of the invention, incoming data might include MIME (Multi-Purpose Internet Mail Extension) headers that indicate data type and/or format. RM 103 could be aware of which interpreter modules handle data of each MIME type and route the data accordingly. RM 103 could learn of such correspondences in a number of ways. For example, RM 103 could receive from each interpreter module a report of the MIME types that it handles. An interpreter module could make such a report, for example, when it is dynamically loaded. Accordingly, if, for instance, a particular MIME header indicated a video in Realplayer format, RM 103 could route the corresponding data to the interpreter module that reported handling Realplayer content.

Many formats have well-defined structures. For example, the structure of SAP/SDP service announcements is outlined in Request for Comments (RFC) documents 2974 and 2327. Accordingly, in certain embodiments of the invention RM 103 could identify the type and/or format of incoming data by examining its structure and then route the data to the appropriate interpreter module. In such embodiments RM 103 could receive from each interpreter module not only a report of handled types and/or formats, but also guidance for recognizing data of the handled type and/or format. For instance, an interpreter module could tell RM 103 of one or more structural elements that would identify an incoming transmission as an SAP/SDP service announcement.

In certain embodiments, incoming data that did not include MIME information might include similar indicators of type and/or format. In such embodiments RM 103 might receive from each interpreter module not only a report of handled types and/or formats, but also a specification of the indicators that identify those types and/or formats. RM functionality in such embodiments would be generally analogous to that described above with reference to MIME-based indicators. In certain embodiments, the RM may route a data stream to an AHM without modification. In other embodiments the RM may first remove protocol layers. As an example, the first case may see SDP/SAP/UDP/IPv6 packets in and identical packets out, whereas the second case may route SDP out, having removed the SAP/UDP/IPv6 lower layer protocol data.

Geography Availability Module

As noted above, certain embodiments include Geography/Availability Module (GAM) 111 that determines the network access points actually available for receiving a particular content item.

For example, BSM 113 may submit a request to GAM 111 asking for the access points actually to the terminal for receiving a stated content item. In response GAM 111 might ask LAM 109 for the access points that are offering the item. GAM 111 might next determine which of the offering network access points are actually available to the device. This determination could be made in a number of ways.

For instance, as alluded to above, GAM 111 may receive and place in associated store messages such as network topology messages and network health messages. Network topology messages may indicate, for example, the geographical location of network access points as well as the reception ranges of these access points. GAM 111, after learning the device's geographical location, could consult these stored topology messages in order to determine which of the offering access points are actually available to the device. GAM 111 could determine the device's geographical location in a number of ways, including querying GPS hardware associated with the device.

GAM 111 could refine its determination of actually available access points by accessing stored health messages. Health messages indicate, for example, the functional statuses of network access points. Thus GAM 111 might initially determine that three access points are actually available to the device but, after learning from the health messages that one of these access points is currently offline, refine its determination accordingly.

In certain cases, GAM 111 could respond to another module's request for all network access points actually available to the device for reception of a particular content item. In other cases GAM 111 might respond to a query for a Boolean response as to whether or not a particular access point was actually available (e.g., the access point to which the device was currently connected). As another example, GAM 111 might receive a query for a Boolean response as to whether or not any access points were actually available for reception of a stated content item. Such queries might come, for example, from UM 117 which could, in turn, indicate GAM 111's response on the grid or other presentation.

Best Selection Module

As alluded to above, certain embodiments of the present invention include Best Selection Module (BSM) 113 that acts to determine the best network access point for the reception of a particular content item. BSM 113 may receive from RFM 115 a request to make such a determination. In some embodiments, the request could include the unique identifier of the content item in question.

In response to the request, BSM 113 could first consult GAM 111 in order to determine the network access points available to the device for receiving the specified content item. BSM 113 may additionally consult LAM 109 to learn the content item's format (e.g., Realplayer video). BSM 113 might next take steps to determine the best access point for receiving the content item. There are a number of ways the functionality for making this determination could be implemented.

For instance, certain embodiments may employ a History Logger Module that records in an associated store the device's success in using various particular network access points under varying situations. With relation to the reception of a particular content item via a particular access point, the History Logger Module might record success properties including the type of item (e.g., Realplayer video), the signal-to-noise ratio experienced, and the QoS (quality of service) experienced. In such embodiments, BSM 113 might consult the History Logger Module's associated store to obtain guidance in determining the best access point. BSM 113 could, for each available option for receiving the content item, learn from the store how well that choice worked in the past. Thus if one option were receiving the content item via a particular DVB-T cell, BSM 113 might consult the History Logger Module store to learn of the how well using that cell worked in the past. BSM 113 might then select for reception of the content item the cell, network, or the like that had the most favorable use history.

In certain embodiments BSM 113's consultation of the store might also take into account the format of the content item for which the best network access point is being sought. Thus if the content item in question was video of QuickTime format, BSM 113 might access from the History Logger Module's store, for each offering access point, the historical success of using that access point for receiving QuickTime video.

A second implementation of BSM 113 might make use of terminal-received messages including success properties indicating the level of success enjoyed by various devices in receiving content items form various particular access points. These messages could originate from a network administrator or the like and could state for various access points properties such as signal-to-noise-ratio, capacity, cost, and QoS. These messages could be routed to BSM 113 and placed in an associated store. In such embodiments, when deciding among several network access points, BSM 113 could consult the stored success properties relating to each access point possibility and select the access point that appears to be most favorable. In certain embodiments, determining the favorability of a, access point could involve the use of an ideality equation involving one or more of the above-noted success properties. In certain embodiments, BSM 113 could always use the same equation. In other embodiments, BSM 113 could be designed with several built-in equations, and messages received at the device would specify which to use. These messages could be sent out by a network administrator or the like. In still other embodiments, a message received at the device could include an ideality equation to be used. Thus a network administrator or the like could choose a new equation and send to one or more devices.

Announcement Handler Modules and Library Access Module

As noted above, certain embodiments of the present invention may include Announcement Handler Modules (AHMs) that extract service properties from service announcements and make these properties available to other modules. AHM functionality will now be described in greater detail.

Service announcements, as alluded to above, typically have well defined structures. For example, the structure of SAP/SDP service announcements is outlined in RFC's 2974 and 2327. Accordingly, an AHM meant to handle service announcements of a particular type could be designed to navigate through the particular well-defined structure of that type and extract service properties contained therein. It is specifically noted that the service properties relating to a particular content item may be split among more than one service announcement. Thus one announcement might include service properties relating to the access points that will offer the item, while a second announcement might contain the other service properties.

After extracting service properties, an AHM could pass these service properties to Library Access Module (LAM) 109. The properties included in particular announcements could vary, but among the service properties included in each announcement would tend to be the unique identifier for the content item being announced. Along with service properties, an AHM might pass to LAM 109 the date of receipt of those service properties. In certain embodiments, an AHM would only do this if announcement date was not one of the received service properties.

Upon receipt of service properties from an AHM, LAM 109 could first consult its associated store in light of any received unique identifier in order to determine if it had previously recorded any service properties relating to the associated content item. If it had not, it could record all of the received service properties. In certain embodiments, LAM 109 would record along with each property the date of recordation and/or the associated announcement date.

On the other hand, if LAM 109 determined that it has already recorded some service properties relating to the item, it could act to determine if it had already recorded any of the particular properties just received. For example, upon receipt from an AHM of the start time and end time for the content item with identifier 060605, LAM 109 could determine if start and end time had already been received for that item. Properties never received could simply be recorded. For properties that had been previously received, LAM 109 could act to determine if the just received property was newer than the one previously received. LAM 109 could make the determination, for example, by consulting the date associated with the previously-recorded property. If the previously-recorded property was found to be older than the just-received property, LAM 109 would replace the older property with the newer one. Thus if a system administrator wished, for example, to notify devices of a change in the start time for transmission of a content item, he could simply send out a new service announcement containing the new time.

In certain embodiments, LAM 109 is capable not only of receiving requests from other modules as described above, but also of receiving requests from external applications. Such functionality could be implemented, for example, through the use of Apple Computer's Applescript or Apple Computer's Distributed Objects. It is further noted that there are a number of ways that LAM 109 could record received service properties. For example, LAM 109 could record received service properties in a database format and/or by way of XML (extensible markup language).

In some embodiments, an AHM may act to convert a service announcement from one format to another. For example, an AHM might take in a service announcement in DVB-SI format and output the announcement in SDPng format. It is also noted that in certain embodiments an AHM may perform no conversion or extraction. Thus an AHM might receive an announcement in SDPng format and output it, to LAM 109 for example, in that same format.

Furthermore, in certain embodiments, LAM 109 is capable of storing received service properties in several formats. For instance, LAM 109 may store both SDP and SDPng descriptions in their native structures by recording them as text strings in an associated database and/or XML store using single or multiple text fields.

Hierarchical Structure

In certain embodiments of the present invention there may be, operating on one or a plurality of computers, multiple occurrences of the software module configuration depicted in FIG. 1 and described above. In further embodiments, such multiple occurrences could communicate with each other so as to operate in a hierarchical manner.

Suppose that the modules of a first occurrence could handle service announcements in DVB-SI format, while the modules of a second occurrence could not and could handle only service announcements in SDPng format. Suppose further it was desired to allow the modules of the second occurrence to make use of a transmitted service announcement in DVB-SI format. This could be achieved by having the AHM of the first occurrence convert the announcement from DVB-SI format to SDPng format, and then pass the converted announcement to the routing module or an AHM of the second occurrence. In the case where the modules of the first and second occurrences operated on different computers, passing of the converted announcement could involve, for example, use simple object access protocol (SOAP).

Hardware and Software

Certain aspects of the present invention may be executed by or with the help of a general purpose computer. For example, the above-described device for selecting and receiving content items may be implemented as a general purpose computer equipped with network interfaces.

Figure 2:
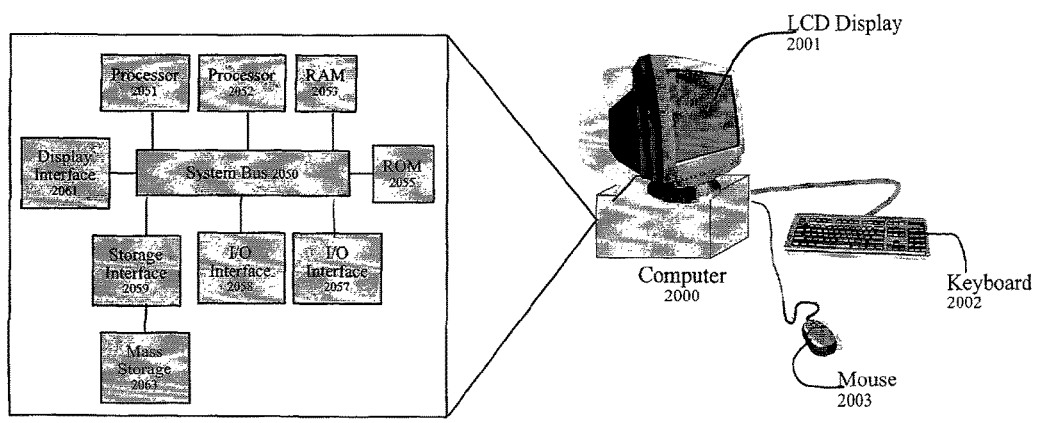
FIG. 2 shows an exemplary general purpose computer which may be used for performing certain aspects of the invention.

The phrases "general purpose computer," "computer," and the like, as used herein, refer but are not limited to an engineering workstation, PC, Macintosh, PDA, mobile terminal and the like running an operating system such as OS X, Linux, Darwin, Windows CE, Windows XP, Symbian OS, or the like, perhaps with support for Java. The phrases "General purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 2000 as shown in FIG. 2 includes system bus 2050 which operatively connects two processors 2051 and 2052, random access memory (RAM) 2053, read-only memory (ROM) 2055, input output (I/O) interfaces 2057 and 2058, storage interface 2059, and display interface 2061. Storage interface 2059 in turn connects to mass storage 2063. Each of I/O interfaces 2057 and 2058 may be an Ethernet, IEEE 1394, IEEE 802.11, or other interface such as is known in the art. Mass storage 2063 may be a hard drive, optical disk, or the like. Processors 2057 and 2058 may each be a commonly known processor such as an IBM or Motorola PowerPC, an Intel StrongARM, or an Intel Pentium.

Computer 2000 as shown in this example also includes an LCD display unit 2001, a keyboard 2002 and a mouse 2003. In alternate embodiments, keyboard 2002 and/or mouse 2003 might be replaced with a pen interface. Computer 2000 may additionally include or be attached to card readers, DVD drives, or floppy disk drives whereby media containing program code may be inserted for the purpose of loading the code onto the computer. In accordance with the present invention, computer 2000 may be programmed using a language such as Java, Objective C, C, C#, or C-I-+ according to methods known in the art to perform the operations described above.

In some embodiments the user interface can be partially or entirely audio based. For instance, keyboard 2002 and/or mouse 2003 might be replaced with a microphone and speech recognition software and LCD display unit 2001 might be augmented with speakers, text-to-speech software and a natural language rendering module.

It is specifically noted that the general purpose computer device described herein could be, for example, a portable device comprising an ARM or a StrongARM processor, an integrated touch-sensitive color screen with the ability to receive DVB-T transmissions and the ability to send and receive UMTS, GPRS, or other transmissions. The device could use an operating system such as Microsoft Windows CE or Symbian OS, perhaps with support for Java.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
    receiving one or more service announcements relating to a content item, each of said service announcements being in at least one of a plurality of formats;
    extracting one or more service properties relating to the content item from said one or more service announcements;
    storing said one or more service properties in a predetermined format, wherein the predetermined format preserves the one or more formats corresponding to each of the one or more service announcements;
    receiving, at a device, information relating to which of one or more offered network access points are actually available to the device; and
    determining which of the available network access points is the best for receiving a selected content item based on success properties associated with the available network access points,
    wherein the success properties are received by the device in one or more messages from one or more other devices, and
    wherein the success properties indicate a level of success associated with receiving other content items by the one or more other devices from the available network access points, the success properties are derived from stored historical experience of the one or more other devices, and the historical experience includes historical success of each of the available network access points receiving a format type of the selected content item.

2. The method of claim 1, wherein the success properties include at least one of a signal-to-noise ratio, a capacity, a cost, and a quality of service associated with the available network access points.

3. The method of claim 1, further comprising:
    choosing an appropriate graphical user interface; and
    using said graphical interface to present to a user information relating to said one or more service properties.

4. The method of claim 1, further comprising:
    choosing an appropriate voice interface; and
    using said voice interface to present to a user information relating to said one or more service properties.

5. The method of claim 1, wherein said plurality of formats includes:
    digital video broadcast service information format, or
    said plurality of formats includes session initiation protocol format.

6. The method of claim 1, wherein said content item comprises a video download, an audio download, or software download.

7. The method of claim 1, wherein:
    said predetermined format is extensible markup language, and
    the stored one or more service properties are accessible by an external application.

8. The method of claim 1, wherein the stored one or more service properties comprise a unique identifier for the content item, a title of the content item, network access points offering the content item or broadcast time of the content item.

9. The method of claim 1, further comprising:
    performing a query regarding whether there has been a change in the best network access point for receiving the selected content item,
    wherein the query is performed when there has been a change in location.

10. An apparatus comprising:
    at least one processor; and
    at least one memory including computer program code for one or more programs,
    the at least one memory and the computer program code configured to, with the at least one processor, cause the apparatus to perform at least the following:
        receive one or more service announcements relating to a content item, each of said service announcements being in at least one of a plurality of formats;

extract one or more service properties relating to the content item from said one or more service announcements;

storing said one or more service properties in a predetermined format, wherein the predetermined format preserves the one or more formats corresponding to each of the one or more service announcements;

receive, at a device, information relating to which of one or more offered network access points are actually available to the device; and determine which of the available network access points is the best for receiving a selected content item based on success properties associated with the available network access points, wherein the success properties are received by the device in one or more messages from one or more other devices, and wherein the success properties indicate a level of success associated with receiving other content items by the one or more other devices from the available network access points, the success properties are derived from stored historical experience of the one or more other devices, and the historical experience includes historical success of each of the available network access points receiving a format type of the selected content item.

11. An apparatus of claim 10, wherein:
the success properties are further derived from historical experience of the device with the available network access points, and
the success properties include at least one of a signal-to-noise ratio, a capacity, a cost, and a quality of service associated with the available network access points.

12. An apparatus of claim 10, wherein the content item comprises a video download, an audio download, or software download, and
the stored one or more service properties comprise a unique identifier for the content item, a title of the content item, network access points offering the content item or broadcast time of the content item.

13. An apparatus of claim 10, wherein the apparatus is further caused to:
choose an appropriate graphical user interface; and
use said graphical interface to present to a user information relating to said one or more service properties.

14. An apparatus of claim 10, wherein the apparatus is further caused to:
choose an appropriate voice interface; and
use said voice interface to present to a user information relating to said one or more service properties.

15. An apparatus of claim 10, wherein said plurality of formats includes digital video broadcast service information format.

16. A non-transitory computer-readable storage medium carrying one or more sequences of one or more instructions which, when executed by one or more processors, cause an apparatus to perform:

receiving one or more service announcements relating to a content item, each of said service announcements being in at least one of a plurality of formats;

extracting one or more service properties relating to the content item from said one or more service announcements;

storing said one or more service properties in a predetermined format, wherein the predetermined format preserves the one or more formats corresponding to each of the one or more service announcements;

receiving, at a device, information relating to which of one or more offered network access points are actually available to the device; and determining which of the available network access points is the best for receiving a selected content item based on success properties associated with the available network access points, wherein the success properties are received by the device in one or more messages from one or more other devices, and wherein the success properties indicate a level of success associated with receiving other content items by the one or more other devices from the available network access points, the success properties are derived from stored historical experience of the one or more other devices, and the historical experience includes historical success of each of the available network access points receiving a format type of the selected content item.

17. A non-transitory computer-readable storage medium of claim 16, wherein the content item comprises a video download, an audio download, or software download, and
the stored one or more service properties comprise a unique identifier for the content item, a title of the content item, network access points offering the content item or broadcast time of the content item.

18. A non-transitory computer-readable storage medium of claim 16,
wherein the success properties include at least one of a signal-to-noise ratio, a capacity, a cost, and a quality of service associated with the available network access points.

19. A non-transitory computer-readable storage medium of claim 16, wherein the apparatus is further caused to:
choosing an appropriate graphical user interface; and
using said graphical interface to present to a user information relating to said one or more service properties.

* * * * *